United States Patent
Toews

(10) Patent No.: US 10,254,912 B2
(45) Date of Patent: Apr. 9, 2019

(54) METHODS AND SYSTEMS FOR NON-INTRUSIVE SYSTEM DATA PIPE

(71) Applicant: HONEYWELL INTERNATIONAL INC., Morristown, NJ (US)

(72) Inventor: Philip Toews, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 747 days.

(21) Appl. No.: 14/850,020

(22) Filed: Sep. 10, 2015

(65) Prior Publication Data

US 2017/0075504 A1    Mar. 16, 2017

(51) Int. Cl.
| | | |
|---|---|---|
| *G06F 3/0481* | (2013.01) | |
| *G06F 8/38* | (2018.01) | |
| *G06F 3/0484* | (2013.01) | |
| *H04L 12/24* | (2006.01) | |
| *H04L 29/08* | (2006.01) | |
| *G06F 9/451* | (2018.01) | |

(52) U.S. Cl.
CPC ........ *G06F 3/0481* (2013.01); *G06F 3/04842* (2013.01); *G06F 8/38* (2013.01); *G06F 9/451* (2018.02); *H04L 41/22* (2013.01); *H04L 67/125* (2013.01)

(58) Field of Classification Search
None
See application file for complete search history.

(56) References Cited

U.S. PATENT DOCUMENTS

| | | |
|---|---|---|
| 8,468,263 B2 | 6/2013 | Fagan et al. |
| 8,755,953 B2 | 6/2014 | Phan et al. |
| 8,762,990 B2 | 6/2014 | Angus |
| 2005/0198580 A1 | 9/2005 | Hua et al. |
| 2010/0114982 A1* | 5/2010 | Ferrell ............... G06F 17/3028 707/803 |
| 2012/0196571 A1* | 8/2012 | Grkov .................... H04L 63/14 455/411 |
| 2015/0074424 A1 | 3/2015 | Uczekaj et al. |

FOREIGN PATENT DOCUMENTS

WO    2009086316 A1    7/2009

OTHER PUBLICATIONS

EP Examination Report for Application No. 16187094.4 dated Jan. 8, 2018.
Extended EP Search Report for Application No. 16187094.4-1954 dated Jan. 25, 2017.
Ramaker, R., et al.; Application of a Civil Integrated Modular Architecture to Military Transport Aircraft; 26th Digital Avionics Systems Conference Oct. 21, 2007.
Fuchsen, R.; Preparing the Next Generation of IMA: A New Technology for the Scarlett Program; Oct. 2009.

* cited by examiner

*Primary Examiner* — Angela Nguyen
(74) *Attorney, Agent, or Firm* — Lorenz & Kopf, LLP

(57) ABSTRACT

Methods and systems are provided for accessing data in a networked system. In one embodiment, a method includes: receiving a request for information from a first system; evaluating a display system to determine a communication request to be generated to obtain the information; and generating a request to a second system based on the communication request.

19 Claims, 6 Drawing Sheets

METHODS AND SYSTEMS FOR NON-INTRUSIVE SYSTEM DATA PIPE

TECHNICAL FIELD

The present disclosure generally relates to methods and systems for accessing data of a system.

BACKGROUND

An aircraft includes various hierarchically related subsystems such as, propulsion systems, flight management systems, etc., that communicate over one or more networks. Legacy aircraft contain a defined set of systems and needed wiring to support the systems. In order to add functionality to a legacy aircraft, the system can be modified to add the functionality, or a new system can be added or provided in place of the existing system to add the functionality. For example, to add a new performance application, the flight management system (FMS) software must be modified. To add the display of the newly computed value on a displayed map, both the FMS software and display software must be modified. In another example, the new performance application could be added to a new system that would require an update to the wiring. Either option can be costly and or time consuming to add the new performance application.

Hence, there is a need for improved methods and for integrating new applications in a legacy aircraft. In addition, there is a need for improved methods and systems for accessing data in any system. Other desirable features and characteristics will become apparent from the subsequent detailed description and the appended claims, taken in conjunction with the accompanying drawings and the foregoing technical field and background.

BRIEF SUMMARY

Methods and systems are provided for accessing data in a networked system. In one embodiment, a method includes: receiving a request for information from a first system; evaluating a display system to determine a communication request to be generated to obtain the information; and generating a request to a second system based on the communication request.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
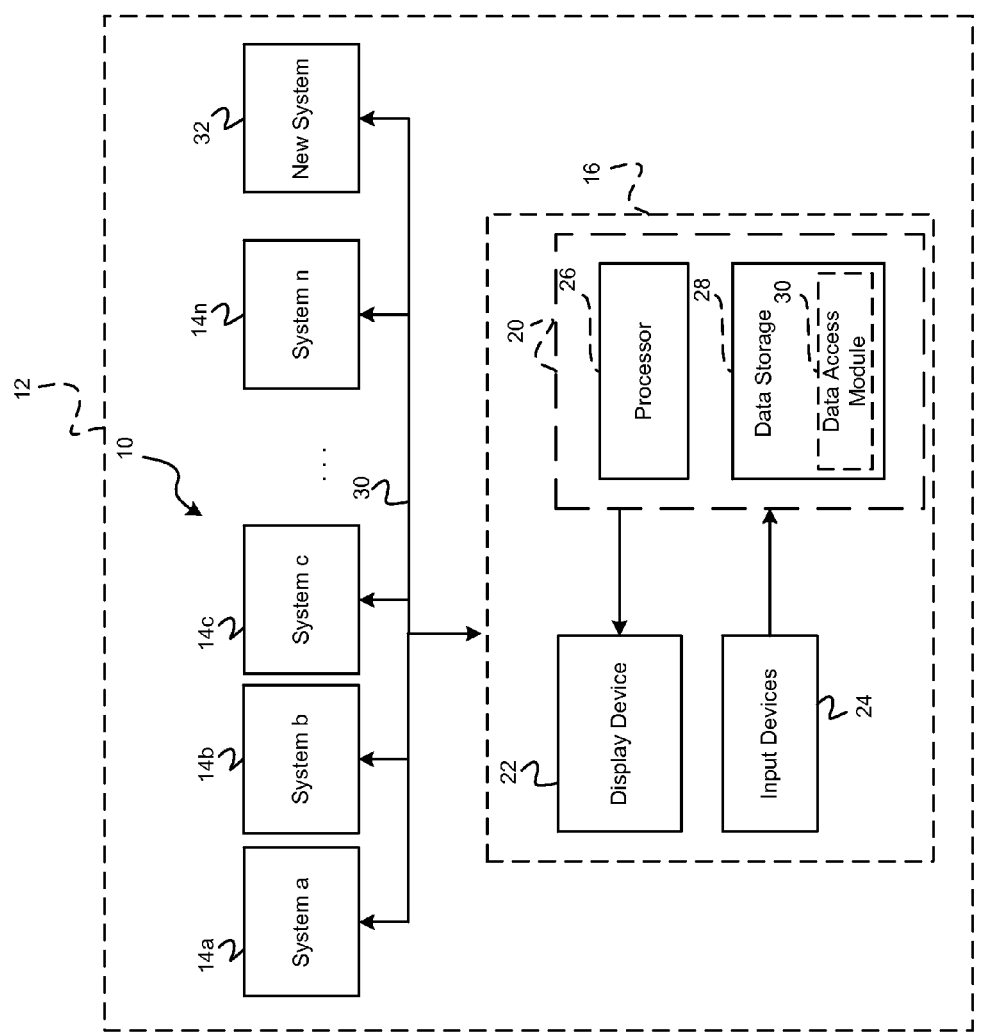
FIG. 1 is a functional block diagram illustrating an aircraft having a data access system in accordance with exemplary embodiments.

Referring now to FIG. 1, exemplary embodiments of the present disclosure are directed to a data access system 10 that may be implemented, for example, on an aircraft 12. As can be appreciated, the data access system 10 described herein can be implemented for networked systems (not shown) other than an aircraft 12. For exemplary purposes, the disclosure will be discussed in the context of the data access system 10 and the aircraft 12. Although the figures shown herein depict an example with certain arrangements of elements, additional intervening elements, devices, features, or components may be present in actual embodiments. It should also be understood that FIG. 1 is merely illustrative and may not be drawn to scale.

As shown in FIG. 1, the aircraft 12 generally includes one or more aircraft systems 14*a*-14*n* that communicate with a display system 16 to display information about the aircraft 12 to a pilot or other user. The aircraft systems 14*a*-14*n* include conventional systems of an aircraft such as, but not limited to, a flight management system, a cabin management system, control systems, etc. The communication between the systems 14*a*-14*n* and the display system 16 may be via a communication bus 18 or other direct or indirect communication means.

The display system 16 includes a computing device 20, a display device 22, and one or more input devices 24. The display device 22 may be located in a cockpit (not shown) of the aircraft 12 for viewing by, for example, a pilot of the aircraft 12. In various embodiments, the display device 22 is an interactive display device (e.g., a touch screen, or other interactive display device) that accepts user input from a user through the one or more of the user input devices 24.

The computing device 20 includes at least a processor 26, and one or more data storage devices 28. The processor 26 can be any custom made or commercially available processor, a central processing unit (CPU), an auxiliary processor among several processors associated with the computing device 20, a semiconductor based microprocessor (in the form of a microchip or chip set), a macroprocessor, or generally any device for executing instructions. The data storage device 28 may be one or a combination of storage elements that store data, and/or instructions that can be performed by the processor 26. The instructions may include one or more separate programs, each of which comprises an ordered listing of executable instructions for implementing logical functions.

In various embodiments, the data storage device 28 stores a data access module 30. In various embodiments, the data access module 30 includes one or more instructions that may be executed by the processor 26 of the computing device 20. In general, the instructions of the data access module 30 cause the display system 16 to communicate with the one or more systems 14a-14n of the aircraft 12 to obtain information. The instructions of the data access module 30 further cause the data access module 30 to receive the information and to provide the information to other new systems 32 of the aircraft 12. For example, the data access module 30 provides the information to a new system 32 or new application of a new system 32 or existing system 14a-14n requesting the information. The data access module 30 provides the information in a non-intrusive manner such that the hardware and/or the software of the aircraft systems 14a-14n and the display system 16 do not have to be modified.

Figure 2:
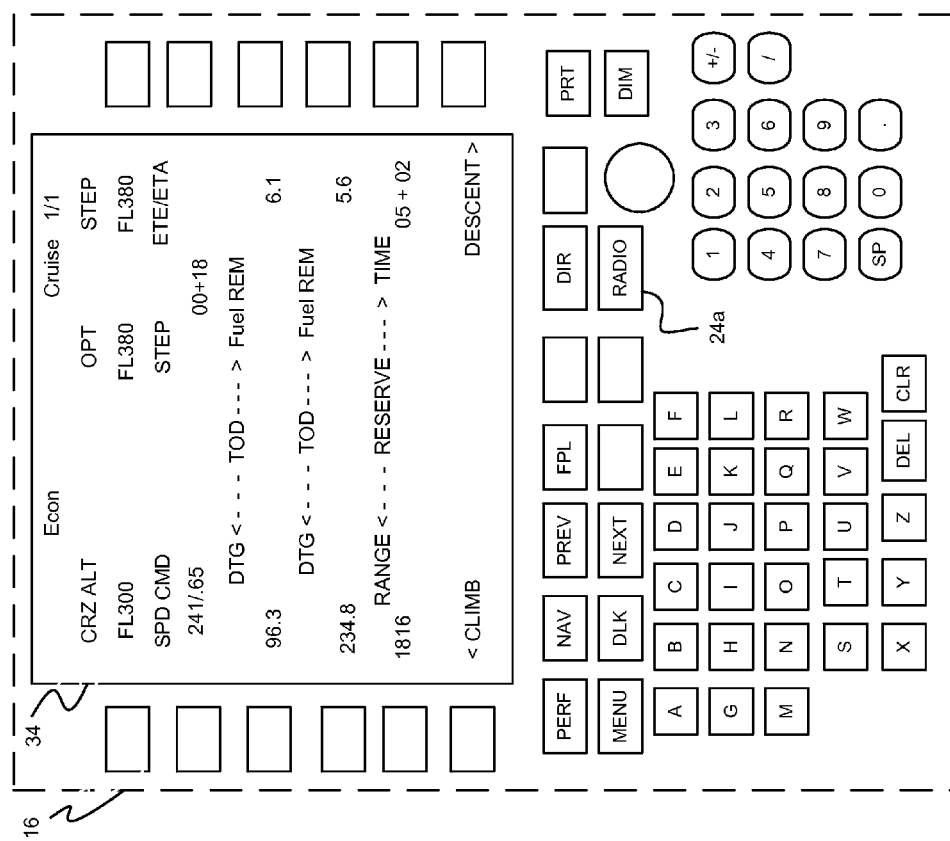
FIGS. 2-4 are illustrations of a data access system of an aircraft in accordance with exemplary embodiments.
Figure 3:
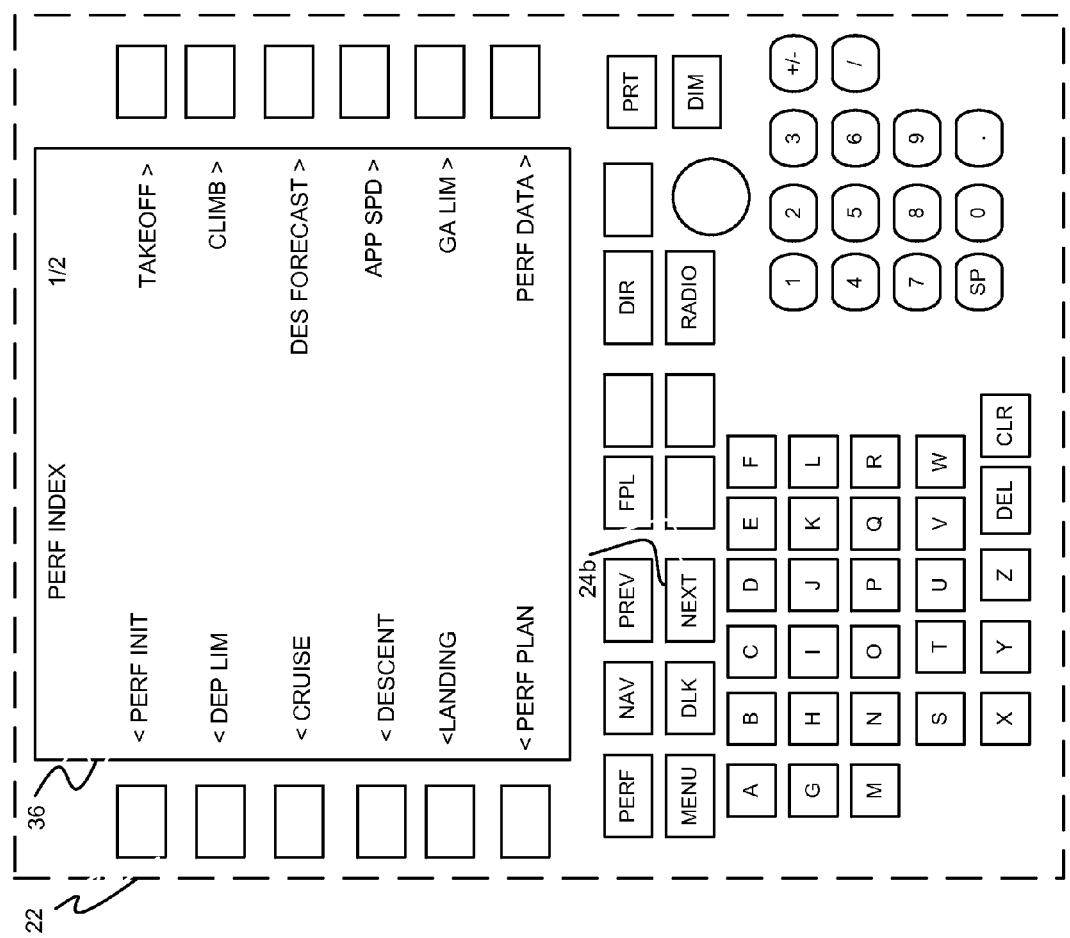
Figure 4:
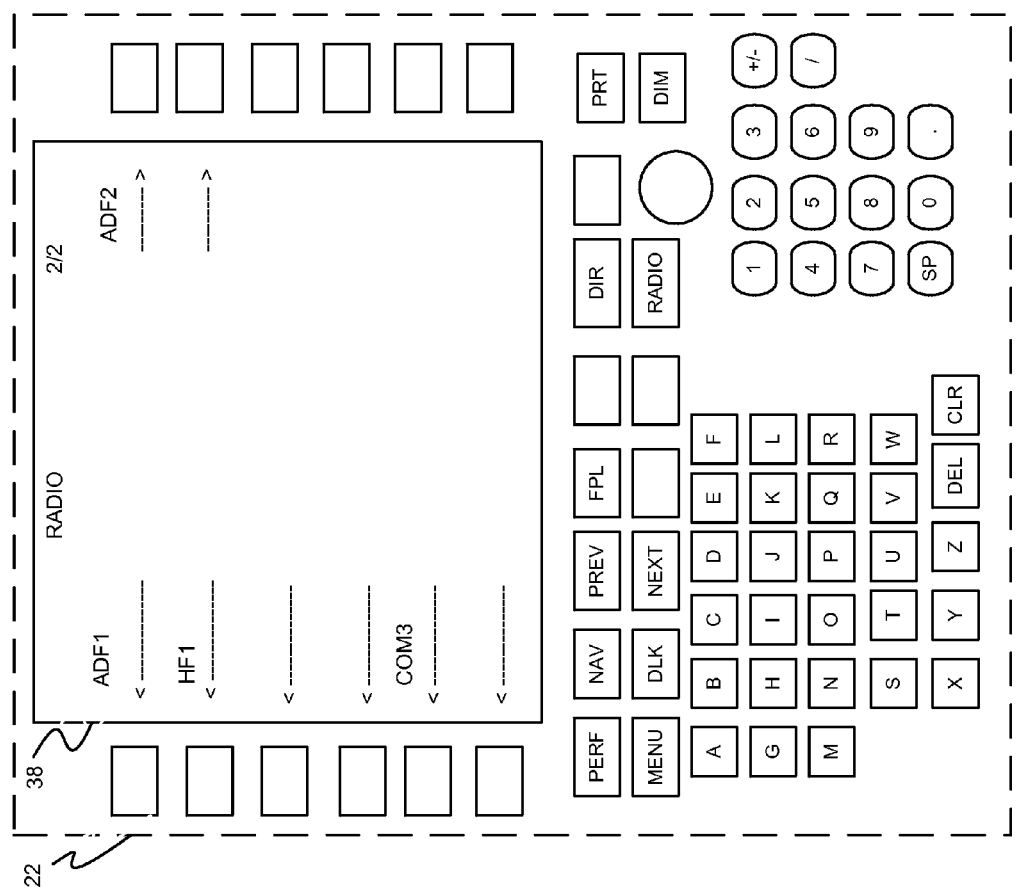

For example, FIGS. 2-4 illustrate an exemplary display system 16 that is implemented as a multi-control display unit (MCDU). The MCDU displays various pages 34-38 of information on the display device 22. The information displayed on the pages 34-38 is populated from information received from one or more of the systems 14a-14n. The pages 34-38 are displayed based on information requested by a user or pilot. The information is requested based on a user's selection of one or more of the input devices 24. For example, when the "ECON Cruise" page 34 is being displayed as shown in FIG. 2, a user can select the "Radio" button input device 24a which results in the "PERF INDEX" page 36 to be displayed as shown in FIG. 3. When the "PERF INDEX" page 36 is displayed as shown in FIG. 3, and a user selects the "NEXT" button input device 24b, the "RADIO" page 38 is displayed as shown in FIG. 4.

The data access module 30 of FIG. 1 makes use of the established relationship between the user selections and the data that is displayed on the pages as a result of the selection to access data from the systems 14a-14n. For example, the data access module 30 simulates certain user selections to cause one or more requests to be generated to one or more of the systems 14a-14n for the information. The data access module 30 simulates the user selections based on the page associated with the information that is requested and a communication protocol associated with the system 14a-14n in which the information is being requested from.

Figure 5:
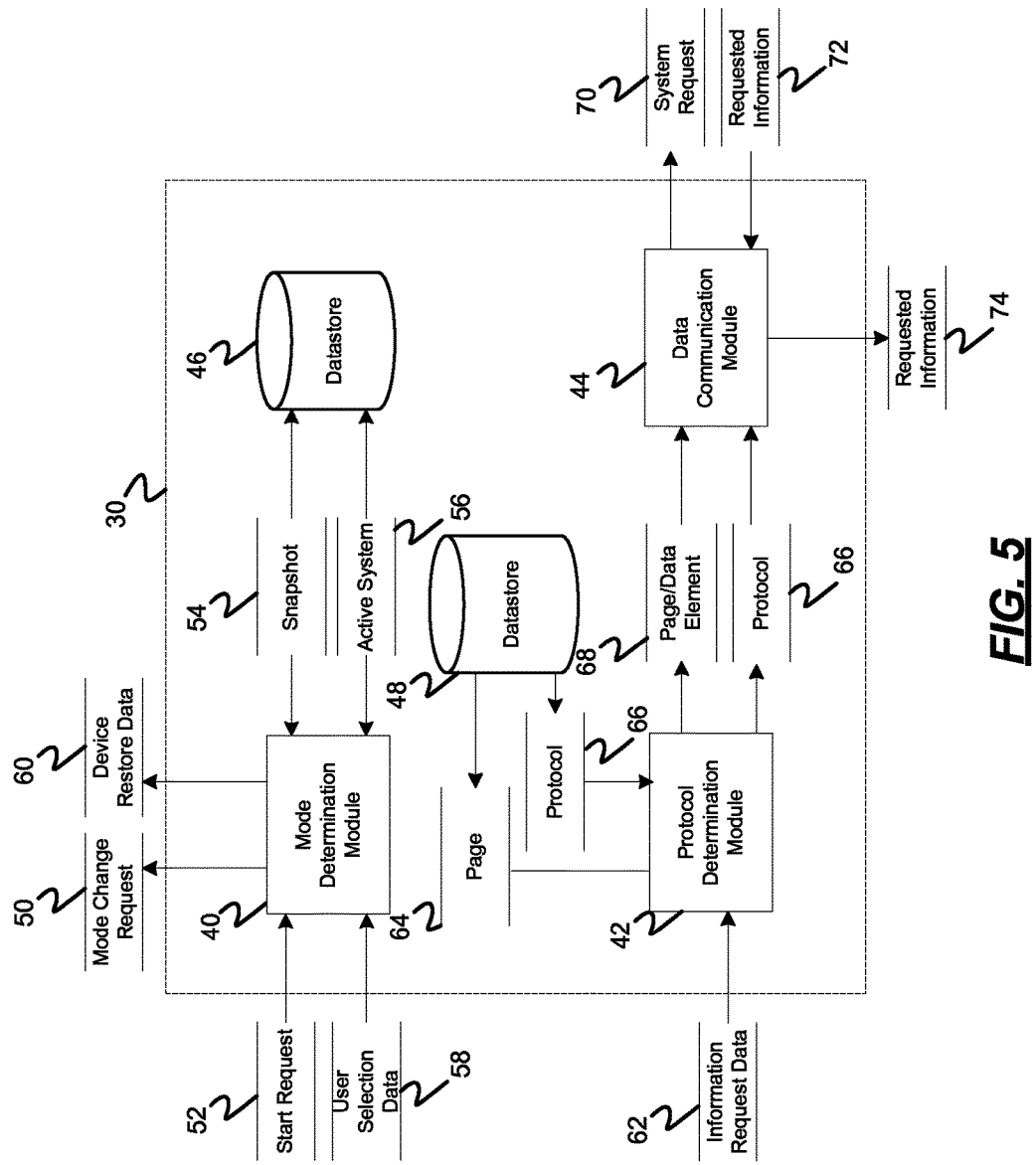
FIG. 5 is a functional block diagram illustrating a data access module of the data access system in accordance with exemplary embodiments.

Referring now to FIG. 5 and with continued reference to FIG. 1, a dataflow diagram illustrates the data access module 30 in more detail in accordance with various embodiments. As can be appreciated, various exemplary embodiments of the data access module 30, according to the present disclosure, may include any number of sub-modules. In various exemplary embodiments, the sub-modules shown in FIG. 5 may be combined and/or further partitioned to similarly access data from the systems 14a-14n and provide the data to new systems or applications 32. In various exemplary embodiments, the data access module 30 includes a mode control module 40, a protocol determination module 42, a data communication module 44, and one or more datastores 46, 48.

The mode control module 40 determines an operating mode of the display system 16 and generates a request 50 to change the current operating mode based on the determined operating mode. In various embodiments, the various operating modes can include, but are not limited to a standard operating mode and a non-display operating mode. For example, when in the standard operating mode, the display system 16 displays information as the information is received. In another example, when in the non-display operating mode, the display system 16 maintains a current display of information and does not display any new information.

In various embodiments, the mode control module 40 determines the operating mode based on received inputs. For example, the mode control module 40 receives as input a start request 52. The start request 52 may be generated by a new system or application 32 that plans to request information. Based on the start request 52, the mode control module 40 determines the operating mode to be the non-display mode and generates the mode change request 50 to change the current mode to the determined non-display mode. The mode control module 40 then captures a snapshot 54 of the current page block displayed by the display system 16 and captures the current active system 56. The mode control module 40 stores the snapshot 54 and the active system 56 in a datastore 46 for future use.

In another example, the mode control module 40 receives as input user selection data 58. The user selection data 58 may be generated based on a user's interaction with one or more input devices 24 of the display system 16. Based on the user selection data 58, the mode control module 40 determines the operating mode to be a standard mode and if the current mode is not already the standard mode, generates a mode change request 50 to change the current mode to the determined standard mode. The mode control module 40 then uses the stored snapshot 54 and the active system 56 to generate device restore data 60 to restore the page block and active system of the display system 16.

The protocol determination module 42 receives as input information request data 62. In various embodiments, the information request data 62 can be a part of the start request 52 or be part of a separate request. The information request data 62 can be generated by the new application that is requesting information. Based on the information request data 62, the protocol determination module 42 determines what information is requested. The protocol determination module 42 then determines which page 64 (from any number of displayable pages) is associated with the information that is requested. For example, an association of the information to a particular displayable page 64 may be stored as a table in a datastore 48 and the page 64 may be looked up from the table based on the information. The protocol determination module 42 then determines a protocol 66 to cause the page and/or a data element of the page 68 to be displayed. For example, the protocol 66 can correspond to a simulation of certain input selections (e.g., button presses, or other selections) to cause the page 64 to be displayed. The protocol determination module 42 provides the protocol 66 and the page or data element 68 to the data communication module 44 for future use.

The data communication module 44 receives as input the protocol 66 and the page or data element 68 to be requested. The data communication module 44 generates system requests 70 to the one or more of the system 14a-14n based on the received protocol 66 and the page or data element 68. In response, the data communication module 44 receives information 72 based on the request. Optionally, the data communication module 44 verifies the received information 72 to ensure that the information received corresponds to the information requested. The data communication module 44 communicates the received information 72 to the new system or application 32 as requested information data 74 based on the protocol established for the new system or application (e.g., which may be known or determined).

Figure 6:
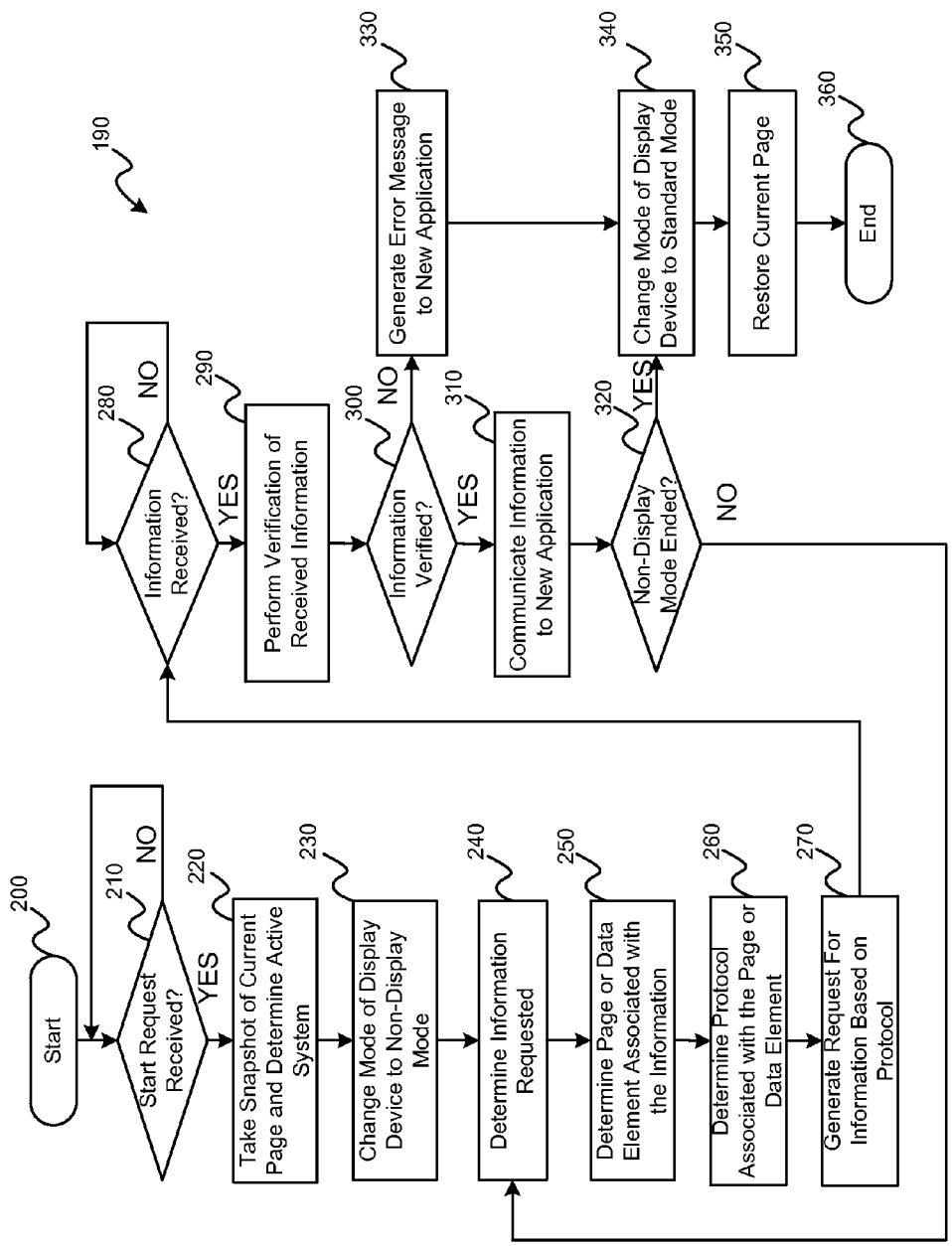
FIG. 6 is a flowchart illustrating a data access method that may be performed by the data access module in accordance with exemplary embodiments.

Referring now to FIG. 6, and with continued reference to FIGS. 1 through 5, a flowchart illustrates a method 190 that can be performed by the data access module 30 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure.

In various embodiments, the method 190 may be scheduled to run based on predetermined events or may be scheduled to run at predetermined time intervals. In one example, the method may begin at 200. It is determined whether a start request 52 is received at 210. If a start request 52 is not received, the method 190 continues to monitor for a start request 52 at 210.

If, however, a start request 52 is received at 210, the snapshot 54 is taken of a current page block and the active system 56 is determined at 220. The mode of the display system 16 is modified to the non-display mode where all received information or the requested information that is received is not displayed at 230. Thereafter, it is determined what information is requested at 240. For example, a subsequent request is received or the first request containing the information request data 62 is processed to determine the information that is requested at 240. The page or data element of the page 68 that is associated with the information that is requested is determined at 250. The protocol 66 associated with the page and/or the particular data element of the page 68 is determined at 260. Thereafter, the system request 70 for the information is generated based on the protocol 66 at 270.

Upon receipt of information from the system 14a-14n at 280, the information is verified at 290. If, the information is not the requested information at 300, optionally an error notification message is generated at 330 and the mode of the display system 16 is modified to the standard mode at 340. The snapshot captured at 220 is used to restore the display device 22 to the current page at 350. Thereafter, the method may end at 360.

If, however, the information is the information that was requested at 300, then the information is communicated to the new system or application 32 at 310. If the non-display mode has not been ended at 320, the method continues to determine the information requested at 240. If, however, the non-display mode has been ended, for example, based on a user's interaction with the display system 16, the mode of the display system 16 is modified to a standard mode at 340. The snapshot 54 captured at 220 is used to restore the display device 22 to the current page at 350. Thereafter, the method may end at 360.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first", "second", "third", etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of accessing data in a networked system, comprising:
   receiving an initial request for information from a first system;
   evaluating a display system to determine a communication request to be generated to obtain the information of the initial request wherein the evaluating comprises evaluating display page information to determine the communication request;
   generating another request to a second system based on the communication request;
   determining a protocol based on the evaluating of the communication request, and wherein the generating of the another request to the second system is based on the protocol wherein the protocol enables a page and/or data element to be displayed;
   storing a snapshot of the display system based on the request for information; and
   restoring the display system based on the snapshot.

2. The method of claim 1, wherein the evaluating comprises evaluating display page information to determine the communication request.

3. The method of claim 1, further comprising receiving information from the second system based on the request to the second system and providing the information to the first system.

4. The method of claim 1, further comprising controlling an operating mode of the display system based on the request for information.

5. The method of claim 3, further comprising verifying the information from the second system.

6. The method of claim 4, further comprising controlling the operating mode of the display system based on a user selection.

7. The method of claim 4, wherein the operating mode is at least one of a standard mode and a non-display mode.

8. A system for accessing data from a network system, comprising:
   a first computer module that receives, by a processor, a request for information from a first system, and that evaluates, by a processor, a display system to determine a communication request to be generated to obtain the information;
   a second computer module that generates, by a processor, a request to a second system based on the communication request wherein the first module determines a protocol based on the evaluating, and wherein the second module generates the request to the second system based on the protocol; and
   a third module that controls an operating mode of the display system based on the request for information wherein the third module stores a snapshot of the display system based on the request for information and restores the display system based on the snapshot.

9. The system of claim 8, wherein the first module evaluates display page information to determine the communication request.

10. The system of claim 8, wherein the second module receives information from the second system based on the request to the second system and provides the information to the first system.

11. The system of claim 8, further comprising a third module that controls an operating mode of the display system based on the request for information.

12. The system of claim 10, wherein the second module verifies the information from the second system.

13. The system of claim 11, wherein the third module controls the operating mode of the display system based on a user selection.

14. The system of claim 11, wherein the operating mode is at least one of a standard mode and a non-display mode.

15. A method of accessing data in a networked system, comprising:
   receiving an initial request for information from a first system;
   evaluating a display system to determine a communication request to be generated to obtain the information of the initial request wherein the evaluating comprises:
   evaluating a display page information to determine the communication request;
   generating another request to a second system based on the communication request;
   determining a communication protocol based on the evaluating of the communication request, and wherein the generating of the another request to the second system is based on a determined communication protocol wherein the determined communication protocol enables a page and/or data element to be displayed;
   receiving information from the second system based on the another request to the second system and providing the information to the first system;
   storing a snapshot of the display system based on the request for information; and
   restoring the display system based on the snapshot.

16. The method of claim 15, further comprising:
   generating, when the received information is not the requested information, an error notification message and then changing a mode of the display system to a standard mode wherein the stored snapshot is used to restore a current page of the display device.

17. The method of claim 15, further comprising:
   communicating, when the received information is the information that has been requested, the information to a new system or application.

18. The method of claim 17, further comprising:
   evaluating, when a non-display mode has not been ended of the display system, the information requested to determine a page or data element associated with the information and a protocol associated with the page or data element to generate requests based on the protocol.

19. The method of claim 17, further comprising:
   changing, when the non-display mode has been ended based on an user interaction with the display system, the mode of the display system to a standard mode and restoring the display device to the current page by using the stored snapshot.

* * * * *